United States Patent [19]
Kondo

[11] Patent Number: 5,541,650
[45] Date of Patent: Jul. 30, 1996

[54] VIDEO CAMERA WITH LOW-SPEED SHUTTER MODE AND AUTOMATIC GAIN AND IRIS CONTROL

[75] Inventor: Toshigaru Kondo, Kanagawa, Japan

[73] Assignee: Sony Corporation, Tokyo, Japan

[21] Appl. No.: 329,765

[22] Filed: Oct. 27, 1994

Related U.S. Application Data

[63] Continuation of Ser. No. 66,992, May 25, 1993, abandoned.

[30] Foreign Application Priority Data

Jun. 10, 1992 [JP] Japan ................................ 4-176077

[51] Int. Cl.⁶ ..................................................... H04N 5/235
[52] U.S. Cl. .......................... 348/229; 348/224; 348/363; 348/364
[58] Field of Search ...................................... 348/207, 221, 348/222, 224, 229, 362, 363, 364, 365, 366, 367; 354/429, 410; H04N 5/235

[56] References Cited

U.S. PATENT DOCUMENTS

| | | | |
|---|---|---|---|
| 4,819,075 | 4/1989 | Imaide et al. | 358/213.18 |
| 4,881,127 | 11/1989 | Isoguchi et al. | 358/213.19 |
| 4,959,727 | 9/1990 | Imaide et al. | 358/228 |
| 4,984,088 | 1/1991 | Tani et al. | 358/228 |
| 5,107,334 | 4/1992 | Matsumoto | 358/180 |
| 5,153,727 | 10/1992 | Choi | 348/216 |
| 5,293,238 | 3/1994 | Nakano et al. | 348/226 |
| 5,386,231 | 1/1995 | shimizu et al. | 348/296 |
| 5,387,930 | 2/1995 | Toh | 348/207 |
| 5,400,074 | 3/1995 | Shimizu | 348/363 |

Primary Examiner—Wendy Garber
Assistant Examiner—Ngoc-Yen Vu
Attorney, Agent, or Firm—Jay H. Maioli

[57] ABSTRACT

A video camera has a low-speed shutter mode in which an exposure time longer than a field period can be set. The camera has a memory means for storing a detected signal of a video signal. A selector has a first terminal, a second terminal and third terminal, the first terminal being supplied with the detected signal of the video signal which is stored in the memory, the second terminal being directly supplied with the detected signal of the video signal, and the third terminal being provided for selecting the first terminal or the second terminal. The detected signal of the video signal is stored in the memory in a period in which the detected signal of the video signal is supplied and optical control is performed by using the detected signal of the video signal which is stored in the memory in a period in which the detected signal of the video signal is not supplied.

6 Claims, 5 Drawing Sheets

VIDEO CAMERA WITH LOW-SPEED SHUTTER MODE AND AUTOMATIC GAIN AND IRIS CONTROL

This is a continuation of application Ser. No. 08/066,992, filed May 25, 1993, now abandoned.

BACKGROUND OF THE INVENTION

1. Field of the Invention

This invention relates to a video camera having, for example, a low-speed shutter mode, and more particularly to a video camera that can always provide optimum exposure control of video signals.

2. Description of the Prior Art

Video cameras equipped with an electronic shutter having high-speed and low-speed shutter modes have been available for practical use. FIG. 1 is a circuit block diagram of one of these video cameras. In FIG. 1, an image injected through a lens 41 is photoelectrically converted by a CCD pickup element 42 and then sent to an A/D converter 45 through a sample-holding circuit 43 and an AGC (Automatic Gain Control) circuit 44. A digital signal output from the A/D converter 45 is supplied to a signal processor circuit 46 and to a detector circuit for exposure control 47. The digital signal, after a predetermined signal processing in the signal processing circuit 46, is stored in a memory 48 as a video signal, and it is taken out from an output terminal 49.

On the other hand, the digital signal supplied to the detector circuit for exposure control 47 is processed with field integration, intra-field peak detection, and so on, and then sent to a controller 50. The controller 50 includes, for example, a comparator, a loop filter, an AGC/iris control circuit, and so forth (not shown). An output signal from the controller 50 is converted to an analog signal in a D/A converter 51 and then supplied to the AGC circuit 44 as a control signal. The same signal is also supplied to the lens 41 through an iris driving circuit 52 as an open/close control signal for an iris provided in the lens 41. As a result, the gain of the iris of the lens 41 and the gain of the AGC circuit 44 are controlled to remain constant.

When the high-speed shutter mode of the electronic shutter of the video camera (for example, not less than 1/60 sec) is used, the video signal is supplied to the output terminal 49 for every field. Therefore, an iris gain and an AGC gain responsive to each field are obtained.

When, however, the low-speed shutter mode of the electronic shutter (for example, less than 1/60 sec; in this case, 1/15 sec) is used, the video signal of only one field (only the field labeled with 1) is supplied to the output terminal 49 for every four fields as shown in FIG. 2. In FIG. 2, the abscissa shows time and the ordinate shows amplitudes of the video signal. The vertical cycles in one field may be, for example, 60 Hz. In the period of three fields with no video signal supplied (the fields labeled with 2, 3 and 4), the iris gain and the gain of the AGC circuit 44 vary. That is, in order to prevent a decrease of the level of the output signal of the detector circuit for exposure control 47, the iris is opened to its maximum, and the AGC gain is maximized. Therefore, for example, when the video signal of the fifth field is input, it is necessary to decrease the iris gain and the AGC gain in accordance with the video signal. For this purpose, when a detected video signal of the fifth field is supplied to the controller 50, the iris gain and the AGC gain are decreased.

At the beginning of the video signal of the fifth field, the iris gain and the AGC gain are at maximum values which are transient to optimum iris and AGC gains for the fifth field. Therefore, it is impossible to obtain optimum iris and AGC gains to the video signal at this time.

OBJECT AND SUMMARY OF THE INVENTION

It is therefore an object of the invention to provide a video camera capable of obtaining optimum iris and AGC gains to video signals throughout the time when the low-speed shutter mode is used.

According to an aspect of the invention, there is provided a video camera having a low-speed shutter mode in which an exposure time longer than a field period can be set, comprising:

memory means for storing a detected signal of a video signal; and selecting means including a first terminal, a second terminal and third terminal, the first terminal being supplied with the detected signal of the video signal which is stored in the memory means, the second terminal being directly supplied with the detected signal of the video signal, the third terminal being provided for selecting the first terminal or the second terminal, wherein the detected signal of the video signal is stored in the memory means in a period in which the detected signal of the video signal is supplied and optical control is performed by using the detected signal of the video signal which is stored in the memory means in a period in which the detected signal of the video signal is not supplied.

According to another aspect of the invention, there is provided a video camera having a low-speed shutter mode in which an exposure time longer than a field period can be set, comprising:

a plurality of memory means for storing a detected signal of a video signal;

calculating circuit supplied with the detected signal of the video signal which is stored in the plurality of memory means; and selecting means including a first terminal, a second terminal and third terminal, the first terminal being supplied with a calculation output of the calculating circuit, the second terminal being directly supplied with the detected signal of the video signal, the third terminal being provided for selecting the first terminal or the second terminal.

wherein the detected signal of the video signal is stored in the plurality of memory means in a period in which the detected signal of the video signal is supplied and optical control is performed by using the calculation output of the calculating circuit in a period in which the detected signal of the video signal is not supplied.

The above, and other, objects, features and advantage of the present invention will become readily apparent from the following detailed description thereof which is to be read in connection with the accompanying drawings.

DETAILED DESCRIPTION OF PREFERRED EMBODIMENTS

Figure 3:
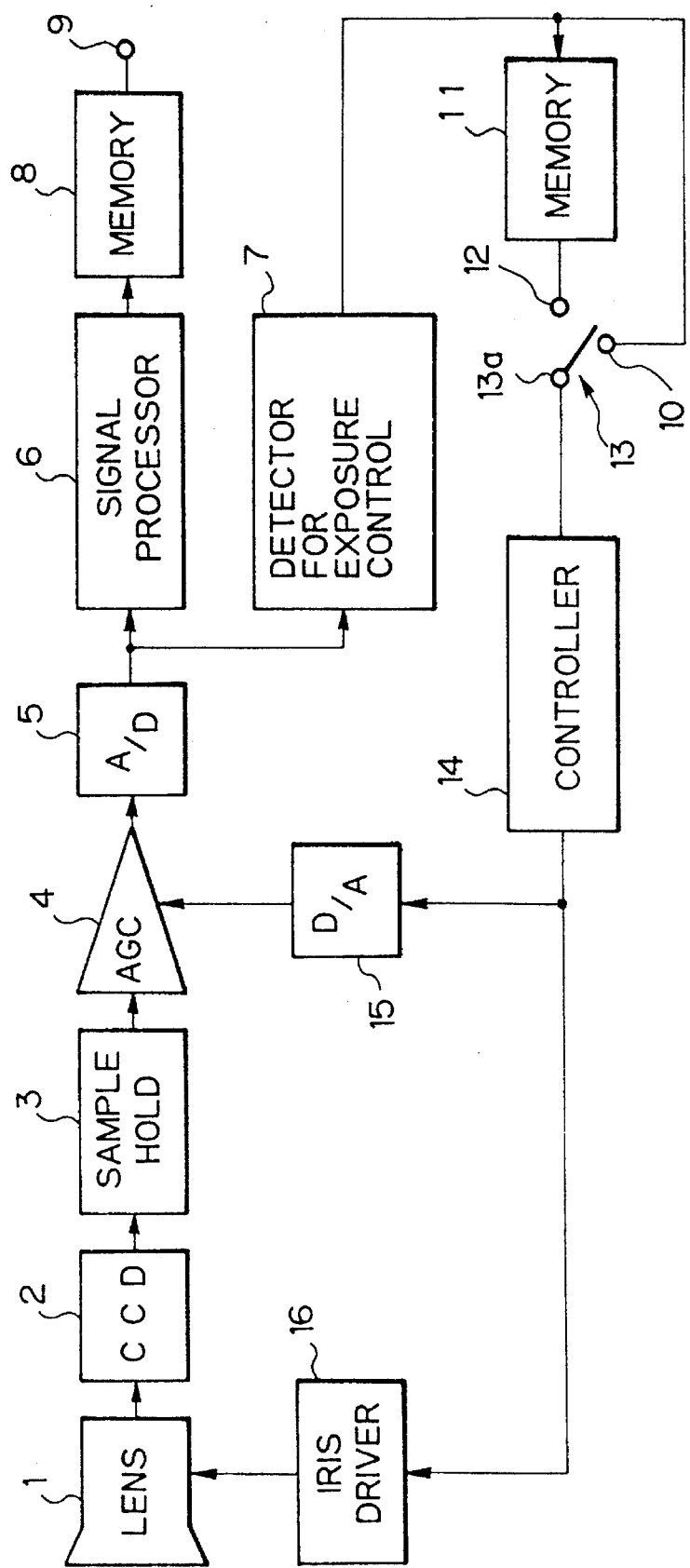
FIG. 3 is a circuit block diagram of a video camera according to the invention.

An embodiment of a video camera to which the invention is applied is explained below with reference to the drawings. FIG. 3 shows a circuit block diagram of a video camera according to the invention. In FIG. 3, an image of a subject injected through a lens 1 is photoelectrically converted by a CCD image pickup device 2, and it is supplied to an A/D converter 5 through a sample-holding circuit 3 and an AGC circuit 4. A digital signal output from the A/D converter 5 is supplied to a signal processor circuit 6 and to a detector circuit for exposure control 7. The digital signal, after a predetermined signal processing in the signal processor circuit 6 is stored in a memory 8 as a video signal, and it is taken out from an output terminal 9.

On the other hand, the digital signal supplied to the detector circuit for exposure control 7 undergoes field integration and intrafield peak detection. An output signal from the detector circuit for exposure control 7 is supplied to a fixed terminal 10 of a switch 13 and, through the memory 11, to a fixed terminal 12 of the switch 13. One of the fixed terminals 10 and 12 is coupled to a controller 14 by a movable terminal 13a of the switch 13. An output signal from the controller 14 is supplied to a D/A converter 15 and to an iris driver circuit 16. An analog signal output from the D/A converter 15 is supplied to the AGC circuit 4 as an AGC gain control signal. An output signal from the iris driver circuit 16 is supplied to the lens 1 as an iris gain control signal.

Figure 4:
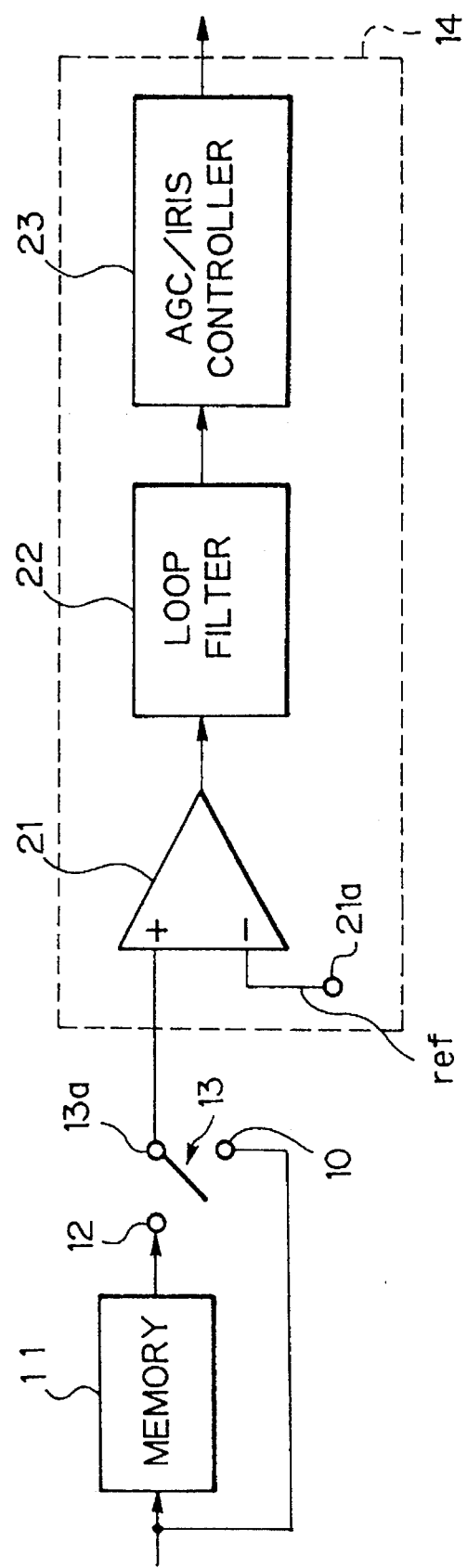
FIG. 4 is a circuit block diagram of details of a controller and its input circuitry.

FIG. 4 illustrates details of the controller 14 and its input circuitry. As shown in FIG. 4, the controller 14 includes a comparator 21, a loop filter 22 and an AGC/iris gain controller circuit 23. A detected video signal supplied through one of the fixed terminals 10 and 12 selected by the movable terminal 13a of the switch 13 is input to the non-inversion input side of the comparator 21. As shown in FIG. 4, the movable terminal 13a is a non-inversion input terminal. The comparator 21 is also provided with a reference voltage ref from an inversion input terminal 21a. A differential output signal of the comparator 21 is supplied through the loop filter 22 to the AGC/iris gain controller circuit 23. A control signal output from the AGC/iris gain controller circuit 23 is supplied to the AGC circuit 4 and to the lens 1 through the D/A converter 15 and the iris driver 16 shown in FIG. 3, respectively.

In the video camera having the above-mentioned arrangement, when its high-speed shutter mode is used, the fixed terminal 10 is selected by the movable terminal 13a, and a detected video signal is supplied to the comparator 21 through the fixed terminal 10. The detected signal is compared with the reference voltage ref, and a differential voltage from the comparator 21 is supplied to the D/A converter 15 and to the iris driver circuit 16 through the loop filter 22 and the AGC/iris gain controller circuit 23.

Figure 1:
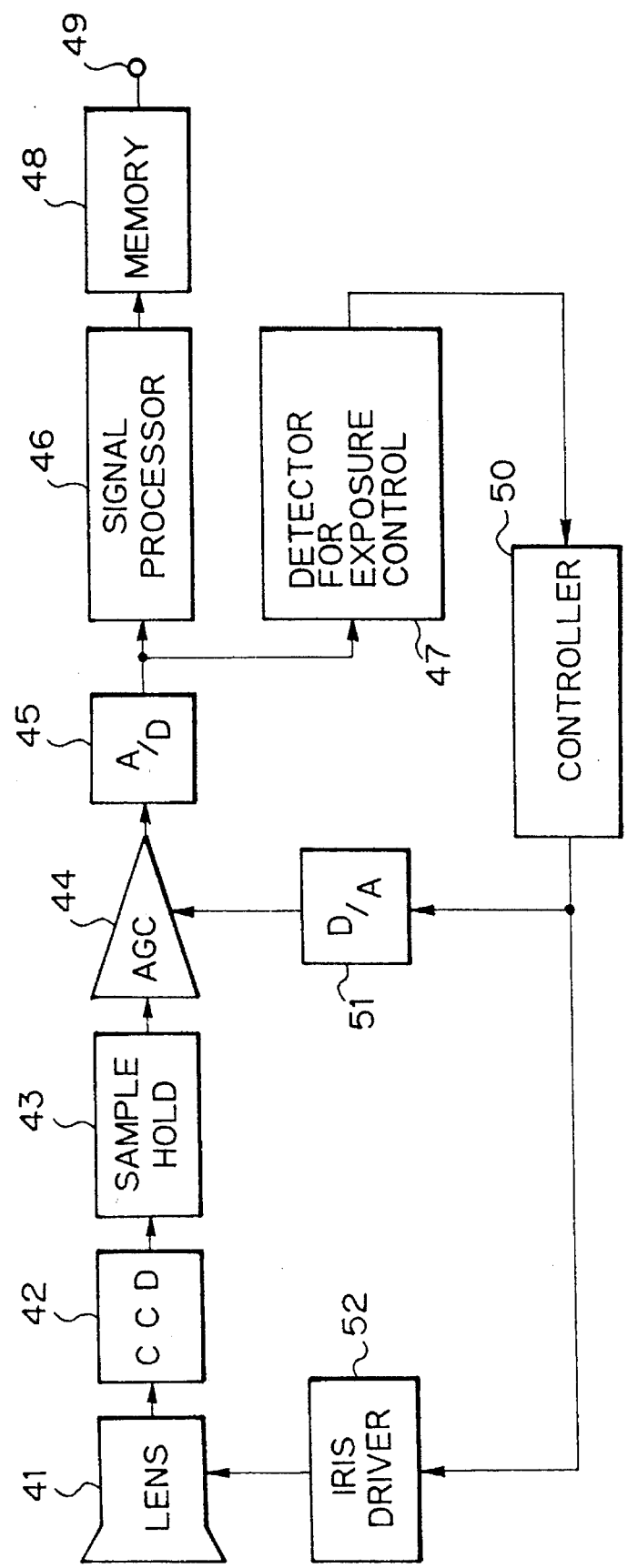
FIG. 1 is a circuit block diagram of an existing video camera.
Figure 2:
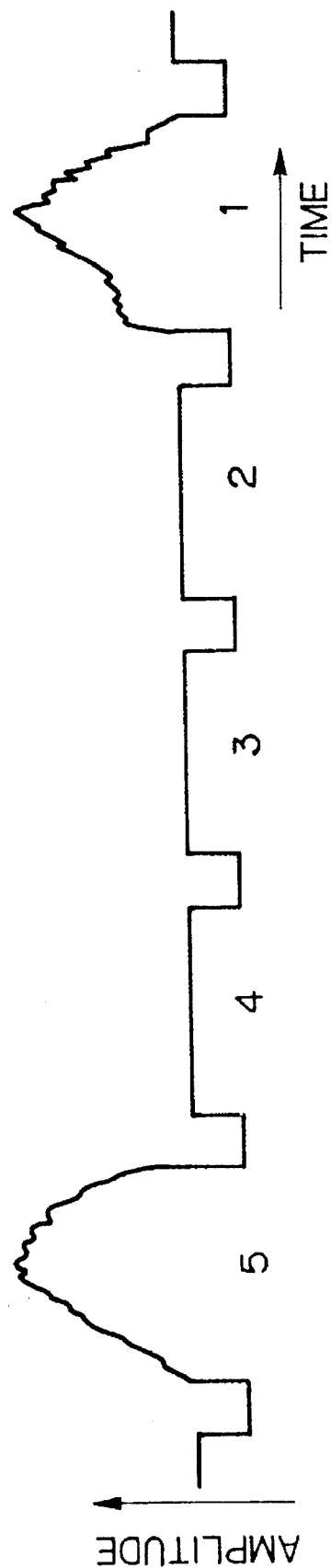
FIG. 2 is a waveform diagram of a video signal during the low-speed shutter mode of the camera.

On the other hand, in case that the low-speed shutter mode of 1/15 sec shown in FIG. 2 is used, the switch 13 is coupled to the terminal 10 in the initial first field. At this time, the detected signal of the video signal in the first field is stored in the memory 11. The detected signal in the first field and input to the comparator 21 is compared with the reference voltage ref. The output signal from the comparator 21 is sent through the loop filter 22 and the AGC/iris gain control circuit 23 to control the iris gain of the lens 1 and the gain of the AGC circuit 4. In the second, third and fourth fields having no video signal supplied, the movable terminal 13a is coupled to the fixed terminal 12. Therefore, in the period of these fields, an output signal from the memory 11 is supplied to the comparator 21. As mentioned above, the detected signal in the first field is stored in the memory 11. The detected signal is supplied to the lens 1 and to the AGC circuit 4 in the same manner as described above.

Thus by supplying the detected video signal stored in the memory 11 to the comparator 21 also in fields with no video signal supplied, optimum iris and AGC gains can be obtained. Further, because of the optimum gains being obtained, the controller 14 exhibits immediate response even when a field with a video signal is input thereto.

Figure 5:
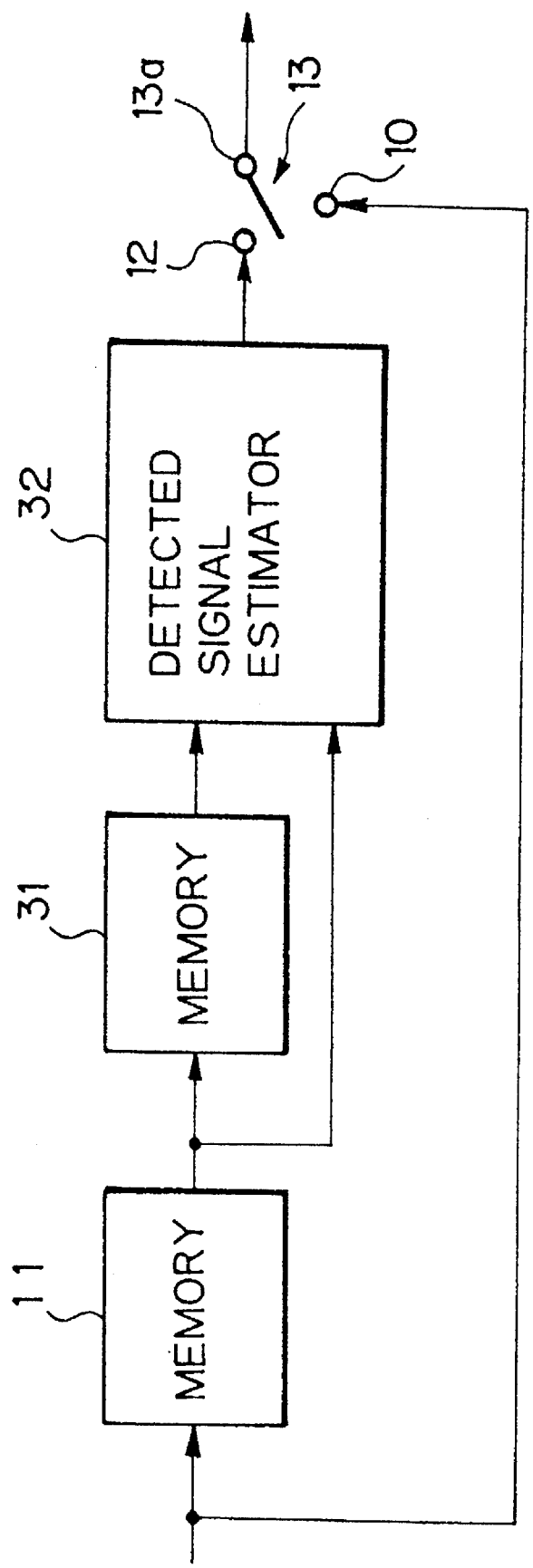
FIG. 5 is a circuit block diagram showing a modification of the video camera according to the invention.

FIG. 5 shows a modification of a circuit for controlling the signal input to the controller 14. Memory 11, fixed terminals 10, 12 and movable terminal 13a of the switch 13 correspond to those of FIG. 3. In FIG. 5, a signal detected by the above-mentioned detector circuit for exposure control is supplied to the memory 11 and to the fixed terminal 10 of the switch 13. An output signal from the memory 11 is supplied to a memory 31 and to a detected signal estimating circuit 32. An output signal from the memory 31 is supplied to the detected signal estimating circuit 32. An output signal from the detected signal estimating circuit 32 is supplied to the fixed terminal 12 of the switch 13. One of the fixed terminals 10 and 12 is selected by the movable terminal 13a. The detected signal supplied from the selected terminal is supplied to the above-mentioned controller through the movable terminal 13a.

For example, when the low-speed shutter mode shown in FIG. 2 is used, the movable terminal 13a is coupled to the fixed terminal 10 in the initial first field of the video signal. As a result, the detected signal at the detector circuit 7 is directly supplied to the controller 14. At this time, the detected signal in the first field is supplied through the memory 11 to the memory 31 and to the detected signal estimating circuit 32. In the second, third and fourth fields with no video signal supplied, the movable terminal 13a is coupled to the fixed terminal 12. As a result, in these field periods, the detected signal in the first field is supplied to the controller 14. Thus, the detected signal of the video signal supplied to the fixed terminal 10 is taken out through the switch 13 in the first field, and the detected video signal supplied to the fixed terminal 12 is taken out in the second to fourth fields.

When a next field having the video signal (fifth field) is supplied to the memory 11, the fixed terminal 10 is selected by the movable terminal 13a. At the same time, the video signal detected in the fifth field is supplied through the memory 11 to the detected signal estimating circuit 32. The detected signal in the first field, which has been stored in the memory 31, is supplied to the detected signal estimating circuit 32. In this circuit 32, the amount of a change in brightness is computed on the basis of the detected video signals in the first and fifth fields supplied. In sixth to eighth fields with no video signal, the movable terminal 13a is coupled to the fixed terminal 12. Therefore, in the sixth to eighth fields, an output signal of the detected signal estimating circuit 32, that is, an amount of exposure calculated on the basis of the detected signal in the first and fifth fields is supplied to the lens 1 and to the AGC circuit 4. By controlling the amount of exposure by the calculation in fields with no video signal, the auto-functional performance of the camera is further improved. Also by increasing the number of memories used and using an acceleration of the amount of change in brightness for computation by the detected signal estimating circuit 32, the performance is further improved.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

For example, although the shutter speed in the low-speed shutter mode is set to $1/15$ sec in the embodiment described above, the invention can be applied to the case where the shutter speed in the low-speed shutter mode is different from $1/15$ sec.

According to the invention, when the low-speed shutter mode is used, the amount of exposure in periods with no detected video signal is controlled on the basis of the amount of exposure for periods with a detected video signal. Therefore, it never happens that the iris is opened or the AGC gains is increased in periods with no video signal. As a result, optimum iris gains and optimum AGC gains can be set immediately in a period with no video signal and a period with a video signal, respectively.

What is claimed is:

1. A video camera having an adjustable iris provided in a lens of the video camera, an automatic gain control downstream of said iris, a low-speed shutter mode in which an exposure time longer than a field period can be set, and an optical control circuit downstream of said automatic gain control with a feedback circuit for opening and closing said iris and adjusting said automatic gain control, said video camera comprising:

memory means within the optical control circuit for storing a detected signal of a video signal; and selecting means within the optical control circuit including a fixed first terminal, a fixed second terminal and a movable third terminal, said first terminal being supplied with the detected signal of the video signal which is stored in said memory means, said second terminal being directly supplied with the detected signal of the video signal, and said third terminal being provided for selecting one of said first terminal and said second terminal, wherein said optical control circuit comprises a comparator, a loop filter and an automatic gain control/iris gain control circuit which supplies a signal to said feedback circuit, said comparator having a non-inversion input connected to said third terminal and an inversion input terminal supplied with a reference voltage, said comparator producing a differential output through said loop filter to said automatic gain control/iris-gain control circuit, and wherein the detected signal of the video signal is generated in certain periods and not in certain other periods, and the detected signal is stored in said memory means in periods in which the detected signal is generated, and optical control is performed by using the detected signal which is stored in said memory means in periods in which the detected signal of the video signal is not generated.

2. The video camera according to claim 1 wherein said memory means is a field memory.

3. The video camera according to claim 1 wherein the detected signal of the video signal is supplied to said second terminal for a period of one field and the stored detected signal of the video signal is supplied to said first terminal for a period of one or more fields.

4. A video camera having an adjustable iris provided in a lens of the video camera, an automatic gain control downstream of said iris, a low-speed shutter mode in which an exposure time longer than a field period can be set, and an optical control circuit downstream of said automatic gain control with a feedback for opening and closing said iris and adjusting said automatic gain control, said video camera comprising:

first and second memories within the optical control circuit;

a calculating circuit; and selecting means within the optical control circuit and including a fixed first terminal, a fixed second terminal and a movable third terminal, said first terminal being supplied with a calculation output of said calculating circuit, said second terminal being directly supplied with the detected signal of the video signal, and said third terminal being provided for selecting one of said first terminal and said second terminal, wherein the first memory provides an output to said calculating circuit and said second memory, and said second memory provides an output to said calculating circuit, the detected signal of the video signal is generated in certain periods and not in certain other periods, and the detected signal is stored in said first and second memories in periods in which the detected signal is generated, and optical control is performed by using the calculation output of said calculating circuit in periods in which the detected signal of the video signal is not generated.

5. The video camera according to claim 4 wherein said first and second memories are field memories.

6. The video camera according to claim 4 wherein the detected signal of the video signal is supplied to said second terminal for a period of one field and the stored detected signal of the video signal is supplied to said first terminal for a period of one or more fields.

* * * * *

UNITED STATES PATENT AND TRADEMARK OFFICE
CERTIFICATE OF CORRECTION

PATENT NO. :   5,541,650
DATED      :   July 30, 1996
INVENTOR(S) :  Toshiharu KONDO It is certified that error appears in the above-identified patent and that said Letter Patent is hereby corrected as shown below:

On the title page: Item [75]

Inventor's Name; change "Toshigaru" to -- Toshiharu--

Item [56]

Under U.S. Patent Documents, Patent No. 5,386,231, change "shimizu" to --Shimizu--

In the Abstract, line 3, delete "means"

Signed and Sealed this

Nineteenth Day of August, 1997

*Attest:*

BRUCE LEHMAN

*Attesting Officer*     *Commissioner of Patents and Trademarks*